July 21, 1942.   H. C. HEISER   2,290,430
INTERNAL COUPLING FOR AWNING ROLLERS
Filed Nov. 28, 1941
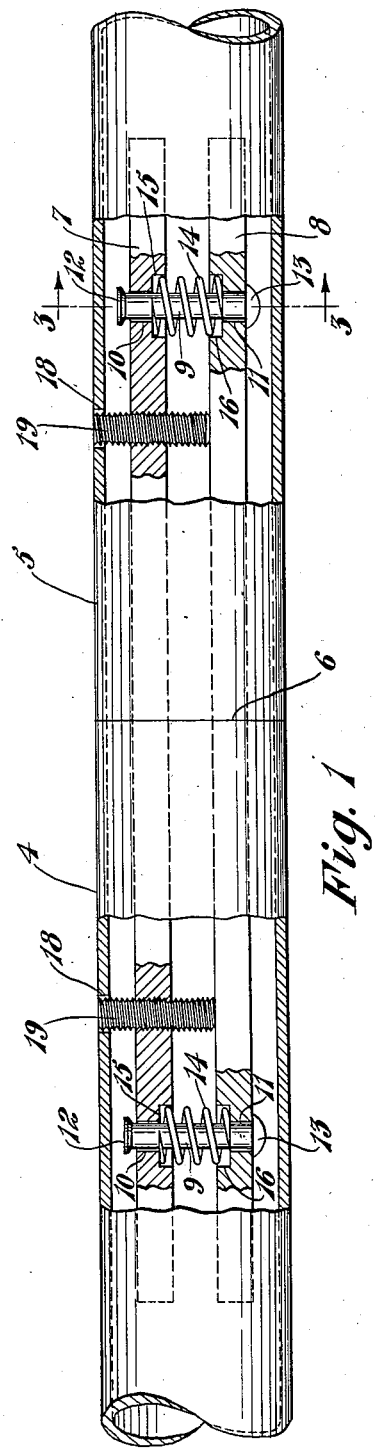
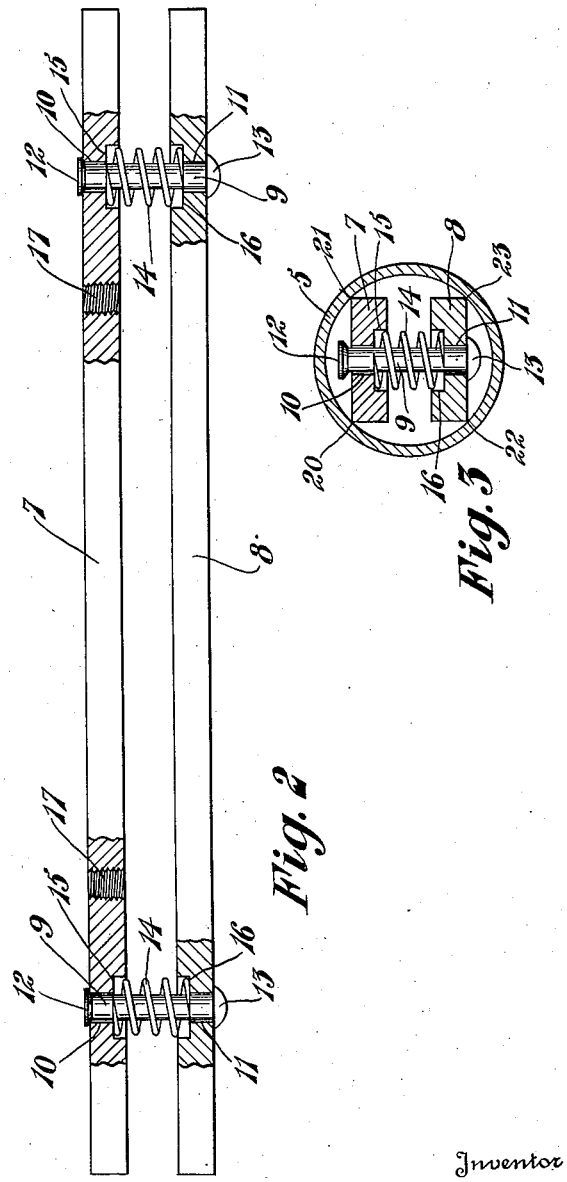
Inventor
Henry C. Heiser
By Frease and Bishop
Attorneys Patented July 21, 1942

2,290,430

UNITED STATES PATENT OFFICE 2,290,430

INTERNAL COUPLING FOR AWNING ROLLERS

Henry C. Heiser, Parma, Ohio, assignor to The Astrup Company, Cleveland, Ohio, a corporation of Ohio Application November 28, 1941, Serial No. 420,817

7 Claims. (Cl. 287—126)

The invention relates generally to rollers on which canvas awnings are wrapped or rolled, the rollers being journaled at the side of a building over a window or the like. More particularly, the invention relates to improved coupling means for attaching two sections of awning rollers together end to end for providing an awning roller of extended length.

Awning rollers are nearly always made from metal tubing such as steel pipe, and due to the fact that many awnings exceed the twenty foot length of standard pipe there is a great demand for couplings for attaching the ends of pipe sections together to form an extended awning roller of the required length with a smooth exterior surface.

Prior couplings for awning rollers usually have been heavy malleable iron coupings of circular construction about a foot long, and having raised portions or ridges one for contacting the inside of each pipe section, so that each size of pipe requires an individual size of coupling. Due to the fact that the inside diameters of steel pipe of the same size vary as much as $\frac{1}{16}$ inch, it is very difficult to obtain a snug and rigid fit between the corresponding size of coupling and the pipe sections connected thereby. Accordingly, it is usually necessary to grind off the ridges on the coupling or to insert shims between the coupling and pipe sections in order to obtain a proper fit and avoid any play when the roller is rotating.

Moreover, with couplings in which the parts inserted into the abutting pipe sections are circular, a contact at only two points is usually obtained because of the non-uniform and varying inside dimensions of pipes of any standard size, with the result that the pipe sections are mis-aligned and the awning roller sags and rises at the joint at every quarter turn of the roller.

It is therefore an object of the present invention to provide a novel and improved coupling for awning rollers which will accurately fit the inside surfaces of standard pipes having varying inside dimensions.

Another object is to provide a novel improved coupling which will contact the inside surfaces of abutting pipe sections in such a way as to rigidly hold the same in alignment while rotating.

A further object is to provide a novel and improved coupling for awning rollers, which will fit the inside surfaces of a range of sizes of tubular rollers.

A still further object is to provide a novel and improved coupling which is light in weight, easy to handle and apply, and economical to manufacture.

These and other objects are accomplished by the present invention, which may be defined in general terms as including two parallel flat bars yieldingly held in spaced apart relation and movable toward each other for insertion into the ends of pipe sections to be connected together, and having screws insertable through the respective pipe sections for forcing the bars apart to provide edge contact between the bars and each pipe section at four circumferentially spaced points.

Referring to the drawing forming part hereof:

Figure 1 is a fragmentary view partly in section of two awning rollers connected together by the improved coupling means;

Fig. 2 is a detached side view partly in section of the improved coupling means, with the screws for expanding the same removed; and Fig. 3 is a cross sectional view as on line 3—3, Fig. 1.

Similar numerals refer to similar parts throughout the several figures of the drawing.

Two pipe sections 4 and 5 are shown in Fig. 1 held in end to end relation by the improved coupling means, the abutting ends of the pipe sections forming a joint indicated at 6. The pipe sections 4 and 5 thus form an awning roller of extended length having a smooth exterior surface.

The improved coupling means includes a pair of flat metal bars 7 and 8 which are maintained in parallel relation by means of rivets 9 slidably inserted through holes 10 defined in the end portions of the bar 7 and through holes 11 in the bar 8. The rivets 9 are each provided with heads 12 and 13 at their ends for limiting the expanding movement of the bars, that is, the movement of the bars away from each other.

Means for yieldingly urging the bars apart preferably includes helical springs 14 encircling the rivets between the bars, there being sockets 15 provided in the bar 7 for receiving the upper ends of the springs 14 and sockets 16 provided in the bar 8 for receiving the lower ends of the springs 14.

Accordingly, in the detached position of the improved coupling shown in Fig. 2, the springs yieldingly hold the bars in expanded or spaced apart position, with the bar 7 abutting the rivet heads 12 and the bar 8 abutting the rivet heads 13.

One of the bars, for example the bar 7 as shown in the drawing, may be provided with threaded holes 17 extending at right angles therethrough, the holes preferably being located one adjacent each of the holes 10 through which the rivets 9 are inserted. The threaded holes 17 are adapted for having set screws screwed therethrough for forcing the bars 7 and 8 apart, as will be further described.

When it is desired to couple the awning rollers 4 and 5 together in end to end relation as shown in Fig. 1, the coupling means shown in Fig. 2 are grasped and squeezed together against the action of the springs 14 and the bars 7 and 8 are thus held while being inserted into the ends of the rollers 4 and 5 to such an extent that the bars extend an equal distance into each of the rollers. The rollers are provided with holes 18 through their walls which holes are adapted to register with the threaded holes 17 in the bar 7. The fact that the springs 14 always urge the bars 7 and 8 toward spaced apart position, as shown in Fig. 2, makes it easy to insert and locate the bars in proper position in the rollers 4 and 5, because the bars do not have to be pried apart and held apart by the operator.

After the bars have been manipulated to bring the holes 17 into register with the holes 18, hollow headed set screws 19 are inserted through the holes 18 and screwed through the holes 17 until their ends abut the inner surfaces of the bar 8, as shown in Fig. 1. By then screwing the set screws in farther, the bars 7 and 8 are further expanded or forced apart and their outer edges held in contact with the inner surfaces of the pipes 4 and 5, in the manner shown in Fig. 3.

Thus, regardless of varying inside pipe dimensions, the bar 7 contacts the inner surface of the pipes 4 and 5 at the edges 20 and 21, and the bar 8 contacts the inner surfaces of the pipes at the edges 22 and 23, so that the edges 20, 21, 22 and 23 provide four circumferentially spaced points of contact between the coupling means and the pipe sections.

The result is that the pipe sections are rigidly held in alignment so that there is no sagging or raising of the awning roller at the joint 6 during rotation. The hollow headed set screws 19 are adapted to pass within the outer surfaces of the rollers so that a smooth exterior surface of the rollers is provided for wrapping the canvas thereon.

The amount of movement of the bars 7 and 8 toward and away from each other is sufficient to permit the use of each novel coupling with a range of sizes of pipe; for example, one size of coupling will fit three standard sizes of pipe, instead of requiring one size coupling for each size of pipe.

While the improved coupling is particularly adapted for connecting awning rollers, it can be used to couple other tubular members end to end within the scope of the appended claims.

The present improved coupling is light in weight, easy to handle and manipulate, and economical to manufacture. Moreover, the only installation labor required is the drilling of one hole in the end portion of each of the rollers to be connected, and then inserting the set screws through said holes and screwing them into the coupling until it is fully expanded.

I claim:

1. Coupling construction for connecting tubular awning rollers in end to end abutting relation, including two flat bars for insertion into the ends of said tubular rollers, means yieldingly holding said bars in parallel spaced apart relation, and means for positively forcing said bars apart for making contact between two edges of each of the bars and each of said tubular rollers.

2. Coupling construction for connecting tubular awning rollers in end to end abutting relation, including two flat bars for insertion into the ends of said tubular rollers, means movably connecting said bars in parallel relation for limited movement relative to each other, and means for forcing said bars apart for making edge contact with each of said tubular rollers at four circumferentially spaced points.

3. In an awning roller having tubular sections abutting each other in end to end relation, coupling means for connecting the tubular sections including flat bars for insertion into the ends of said tubular sections, means movably connecting the bars, means yieldingly urging the bars apart, and means accessible through each of said tubular sections for positively forcing said bars apart into edge contact with the inner surfaces of said sections.

4. In an awning roller having tubular sections abutting each other in end to end relation, coupling means for connecting the tubular sections including flat bars for insertion into the ends of said tubular sections, means yieldingly urging the bars apart, and means accessible through each of said tubular sections for positively forcing said bars apart into edge contact with the inner surfaces of said sections at four circumferentially spaced points.

5. In an awning roller having tubular sections abutting each other in end to end relation, coupling means for connecting the tubular sections including flat bars for insertion into the ends of said tubular sections, means movably connecting the bars, and means accessible through each of said tubular sections for forcing said bars apart into positive clamping contact with the inner surfaces of said sections at four circumferentially spaced points.

6. Coupling construction for connecting tubular awning rollers together in end to end abutting relation, including two flat bars for insertion into the ends of said tubular rollers, rivets connecting said bars in parallel relation for limited expanding movement away from each other, springs between said bars for urging them apart, and means for positively forcing said bars apart to contact the edges of the bars with the inner surfaces of the awning rollers.

7. Coupling construction for connecting tubular awning rollers together in end to end abutting relation, including two flat bars for insertion into the ends of said tubular rollers, rivets connecting said bars in parallel relation for limited expanding movement toward and away from each other, springs between said bars for urging them apart, and screws threaded through one bar and abutting the other bar for positively expanding said bars away from each other to contact the edges of the bars with the inner surfaces of the owning rollers.

HENRY C. HEISER.